(12) United States Patent
Cumming et al.

(10) Patent No.: US 9,239,925 B2
(45) Date of Patent: Jan. 19, 2016

(54) PROCESSOR SECURITY (75) Inventors: Pete Cumming, Wickwar Gloucester (GB); Alex Berdery, Antibes (FR); Jean Marc Guiradet, Chateauneuf de Grasse (FR)

(73) Assignee: Nvidia Technology UK Limited, London (GB)

( * ) Notice: Subject to any disclaimer, the term of this patent is extended or adjusted under 35 U.S.C. 154(b) by 290 days.

(21) Appl. No.: 13/577,300

(22) PCT Filed: Feb. 14, 2011

(86) PCT No.: PCT/EP2011/052148
§ 371 (c)(1),
(2), (4) Date: Aug. 6, 2012

(87) PCT Pub. No.: WO2011/098606
PCT Pub. Date: Aug. 18, 2011

(65) Prior Publication Data
US 2012/0311314 A1 Dec. 6, 2012

(30) Foreign Application Priority Data
Feb. 12, 2010 (GB) .................................. 1002403.2

(51) Int. Cl.
*G06F 21/57* (2013.01)
*G06F 21/51* (2013.01)
(52) U.S. Cl.
CPC .............. *G06F 21/575* (2013.01); *G06F 21/51* (2013.01)
(58) Field of Classification Search
None
See application file for complete search history.

(56) References Cited

U.S. PATENT DOCUMENTS

| 4,980,887 | A   | * | 12/1990 | Dively et al. ................. 714/713 |
|-----------|-----|---|---------|-----------------------------------------|
| 5,892,906 | A   |   | 4/1999  | Chou et al.                             |
| 6,757,829 | B1  |   | 6/2004  | Laczko, Sr. et al.                      |
| 2001/0018745 | A1 | * | 8/2001  | Laczko et al. ................ 713/200 |
| 2002/0073316 | A1 | * | 6/2002  | Collins et al. ................. 713/174 |
| 2003/0005289 | A1 | * | 1/2003  | Gougeon et al. .............. 713/156   |
| 2003/0051192 | A1 | * | 3/2003  | Pillay et al. ...................... 714/39 |
| 2006/0191016 | A1 |   | 8/2006  | Ostergren et al.                        |
| 2008/0205651 | A1 |   | 8/2008  | Goto et al.                             |
| 2010/0017659 | A1 |   | 1/2010  | Dos Remedios                            |
| 2010/0180114 | A1 | * | 7/2010  | Bolton et al. ................. 713/164 |
| 2011/0093713 | A1 | * | 4/2011  | Blot-Lefevre ................ 713/175   |
| 2011/0258442 | A1 | * | 10/2011 | Casilao et al. ................ 713/168 |

FOREIGN PATENT DOCUMENTS

| CN | 101256613 A  | 9/2008 |
| EP | 0961193 A2   | 1/1999 |
| EP | 0961193 A3   | 1/1999 |

(Continued)

*Primary Examiner* — David Le (57) ABSTRACT

A device comprises a processor arranged to automatically execute boot code upon start-up or reset. The boot code comprises a code authentication procedure to verify whether additional code is authenticated for execution on the processor. A separate security unit comprises a private unlock key and cryptography logic configured to use the private unlock key to sign a portion of data, thereby generating a signed unlock file for supply to a storage location. The processor is arranged to access the unlock file from the storage location, making it available without requiring connection to the security unit. The boot code further comprises an unlocking authentication procedure configured to check for the unlock file in the storage location, and if available to verify whether the unlock file is authenticated for use on the processor based on its signature, so as to de-restrict the boot authentication procedure on condition of verifying the unlock file.

50 Claims, 4 Drawing Sheets

(56) References Cited

FOREIGN PATENT DOCUMENTS

| EP | 1385078 A3 | 6/2008 |
| WO | 0010283 A1 | 2/2000 |
| WO | 02103495 A1 | 12/2002 |
| WO | 2011098606 A1 | 8/2011 |

* cited by examiner

PROCESSOR SECURITY

CROSS-REFERENCE TO RELATED APPLICATION

This application is the National Stage of, and therefore claims the benefit of, International Application No. PCT/EP2011/052148 filed on Feb. 14, 2011, entitled "PROCESSOR SECURITY," which was published in English under International Publication Number WO 2011/098606 A1 on Aug. 18, 2011, and has a priority date of Feb. 12, 2010, based on GB application 1002403.2. Both of the above applications are commonly assigned with this National Stage application and are incorporated herein by reference in their entirety.

FIELD OF THE INVENTION

The present invention relates to authenticating code to be executed on a processor.

BACKGROUND

Public key cryptography involves the generation of an asymmetric key pair, usually referred to as the public and private key. They are so called because the private key is kept secret by the party implementing the cryptography scheme in question, whilst the public key is distributed to one or more other parties (though it need not be "public" in the sense of being freely or indiscriminately available—distribution of the public key in many situations may still be carefully restricted).

Figure 1:
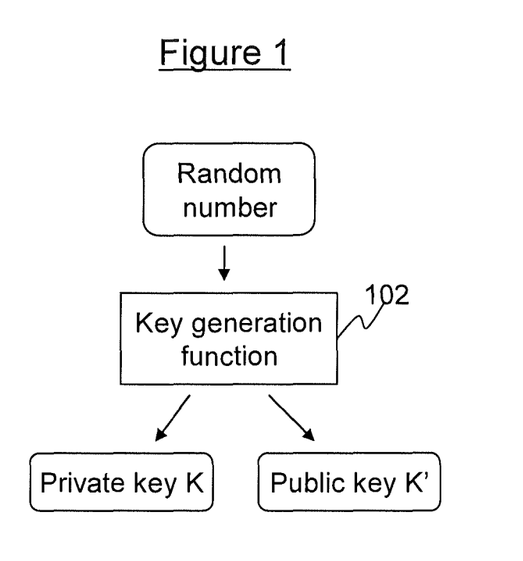
FIG. 1 is a schematic block diagram of a public and private key pair generation process.

As illustrated schematically in FIG. 1, a public and private key pair is typically generated based on a large random number being input to a key generation function 102. The public key K' and private key K are thus mathematically related to one another by the generation function and the random number, but due to the nature of this function then it is not practically feasible to derive or deduce the private key K from the public key K'. One example of a key generation function is an RSA (Rivest, Shamir and Adleman) algorithm. Details of this and other suitable algorithms for use in a key generation function 102 will be familiar to a person skilled in the art.

Public key cryptography comes in two kinds. The first is public key encryption, whereby a sender encrypts a message using the public key and the recipient decrypts the message using the private key, thus keeping the information content of the message secret from anyone other than the holder of the private key. The second kind is authentication, whereby a supplier of certain information "signs" that information using a private key. Any holder of the public key can then verify that the information did indeed originate from the holder of the private key, and is therefore authentic. The characteristic feature of asymmetric or public key techniques is that the key used to encrypt or sign the information is not the same as the key used to decrypt or authenticate it. The following relates to the latter kind of public key cryptography, for authentication.

Figure 2:
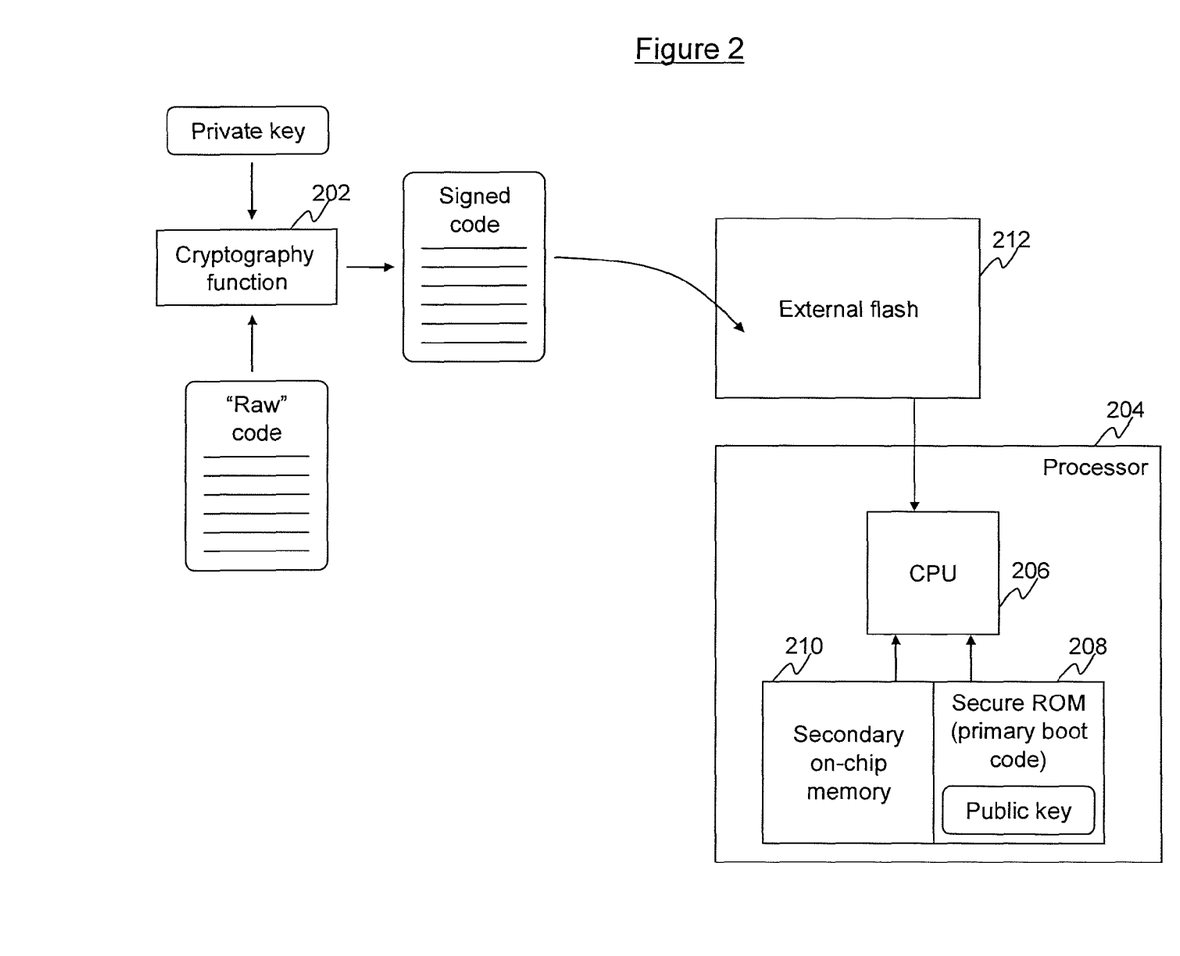
FIG. 2 is a schematic block diagram of a processor system for authenticating and running signed secondary code.

As illustrated schematically in FIG. 2, such techniques can be used by a secure boot procedure in order to verify the authenticity of other software to be run on a processor. FIG. 2 shows a processor 204 in the form of an integrated circuit (IC), or "chip". The processor chip 204 comprises a central processing unit (CPU) 206 and a first non-volatile on-chip memory 208, and optionally a second non-volatile on-chip memory 210. Furthermore, the CPU 206 is operably coupled to a non-volatile off-chip memory 212.

The first on-chip memory 208 is the primary boot memory, storing the primary boot code. The CPU 206 is hard-wired so as, upon start-up or reset of the processor, to automatically begin executing the primary boot code from the primary boot memory 208. When executed, the primary boot code performs the basic initialisation of the processor required to get it up and running. The primary boot memory 208 preferably takes the form of a secure Read Only Memory (ROM) which is arranged to be unalterable by customers or users, e.g. a one-time programmable memory in which the data elements are permanently fused once programmed such that the memory cannot be re-written.

The off-chip memory 212 may be used to store secondary boot code. The primary boot code includes a procedure whereby, once it has suitably configured the processor, it automatically instigates execution of the secondary boot code to provide further "soft" boot functionality. The secondary boot code allows some of the boot functionality of the processor 204 to be programmed "in the field" by the customer (e.g. a maker of a user terminal such as a wireless mobile cellular device in which the chip is to be incorporated), whereas the primary boot code comes pre-programmed from the manufacturer of the chip itself, and should not be alterable by the customer or user. The off-chip memory 212 could also be used to store applications for running on the processor, and/or data files. The off-chip memory 212 could for example be an erasable programmable memory (EPROM) such as an external flash memory.

Alternatively or additionally, the secondary on-chip memory 210 could be used to store secondary boot code, other applications, and/or data files. The secondary on-chip memory 210 could for example be an EEPROM such as an on-chip flash memory. Further, applications and data could be retrieved from a magnetic storage medium or even from a network such as the Internet.

A production processor is an instance of the processor supplied to a customer for use in a product such as a user terminal. Production processors are often configured to only authenticate software signed using production keys, locking the device to only run code that has been formally signed using these secure production keys. Particularly, the boot code is configured to verify that other code has been authentically signed before allowing it to be executed. For example, the secondary boot code may be configured to verify that applications have been authentically signed before allowing them to be loaded and executed.

As shown in FIG. 2, the signing process comprises inputting both a private key and the application code into a cryptography function 202, which outputs the code with a cryptographic signature based on the private key. The cryptography function 202 is a one-way function such as a hash function, details of which will be familiar to a person skilled in the art. It is this signed version of the application that is installed on the off-chip memory 212 (or secondary on-ship memory 210). The boot code comprises or has knowledge of the corresponding public key, and is configured to use the public key to verify the authenticity of this signature before allowing the application to be loaded and run on the processor (and to only to do so on condition of the verification). Thus the processor can verify that it is executing software that has been authorised for use on that processor, i.e. originating from a party that holds the private key and is thereby authorised to supply applications for the processor in question (typically the designer or manufacturer of the chip, or an authorised partner of theirs). A similar process could also be used to authenticate data files.

Nonetheless, it may be desirable to be able unlock individual production processors so they can run trial software.

This should be done in such a way as to avoid compromising devices that have not been explicitly unlocked.

Conventionally this is often done using a secret back door. However, this approach is flawed since obscurity is not an adequate security measure—the "obscure" secret back door mechanism may become publicly known and if it does then the security of every instance of the processor is compromised.

Otherwise the unlocking feature may not be provided at all, making it impossible to provide trial software to specific devices. In this case, the only way to allow trial software would be to divulge the private production key, which would be expensive due to the security procedures involved, and would also risk comprising the production key and thereby compromising the security of every instance of the processor.

Approaches have been suggested involving secure databases of chip IDs stored when devices are manufactured. However, these databases would be inherently difficult to maintain securely, given the manufacturing environment.

It would be desirable to provide a processor that can be unlocked to run unsigned trial software, but without significantly compromising the security of every instance of the processor.

SUMMARY

According to one aspect of the present invention, there is provided a system comprising: a device comprising a processor and a memory storing boot code arranged to be automatically executed by the processor upon start-up or reset, wherein the boot code comprises a code authentication procedure operable to verify whether additional code is authenticated for execution on the processor; and a separate security unit comprising a private unlock key and cryptography logic configured to use the private unlock key to sign a portion of data, to thereby generate a signed unlock file for supply to a storage location; wherein the processor is arranged to access the unlock file from the storage location, such that the unlock file is made available to the processor without requiring connection between the processor and security unit; and wherein the boot code further comprises an unlocking authentication procedure configured to check for availability of the unlock file in the storage location, and if available to verify whether the unlock file is authenticated for use on the processor based on its signature, so as to de-restrict the boot authentication procedure on condition of verifying the unlock file.

The present invention thus modifies the secure boot code to look for and authenticate a signed unlock file. If present, the secure boot will de-restrict the authentication procedure, preferably to accept code and data that is signed with a development key having a lower level of security that the production key, or potentially even to bypass the authentication procedure altogether. The unlock file is generated by a security unit such as a dongle.

A conventional security dongle has to remain plugged into a device to allow it to run a particular piece of software. The dongle enables the software to run only as long as it is connected to the device and no longer—the software will not run on the device after the dongle has been disconnected.

However, the security unit of the present invention generates an unlock file which is stored to a location accessible by the processor but separate from the security unit, and is therefore made available to the processor without the security unit needing to be physically connected to it. Thus once the unlock file has been generated, the boot authentication procedure can be de-restricted even if the security unit is not physically present, but because the unlock file is signed and authenticated then security is still maintained.

In preferred embodiments, the processor has a restricted mode and a de-restricted mode and is set into the restricted mode by a hardware setting or other mechanism protected by hardware, the code authentication procedure being configured to operate at a higher security level in the restricted mode and a lower security level in the de-restricted mode; and in such embodiments the unlocking authentication procedure is configured to perform said de-restriction by overriding the hardware setting or other hardware-protected mechanism and thus enabling said de-restricted mode. For example the processor may be set into the restricted mode by one or more fuse latches, and the unlocking authentication procedure may be configured to perform said de-restriction by overriding the one or more fuse latches.

Thus the processor may comprise a security mechanism with at least two (or more) levels of security chosen in hardware (e.g. by a setting fused into one or more fuse latches on the processor). However, by using an authenticated unlock file, the present invention advantageously allows the hardware setting to be subsequently overridden in order to downgrade the security level.

In particularly preferred embodiments the unlock file may include an identifier of the device or processor, e.g. a chip ID of the processor. This advantageously means the unlock file is tied to unlocking only specific instance of the device or processor, so that the existence of the unlock file does not compromise the security of other instances.

Preferably, the unlock file may be generated by interacting between a portable security unit and a computer terminal separate from the device being unlocked. This is advantageous since it means that, once generated, the unlock file can be supplied to the device in question without the security unit being physically present at the site of that device. However, because the unlocking is tied to the chip identifier, then the unlock file can does not compromise the security of any other instances of the processor, and can be transported or transferred from the computer terminal to the device in an insecure manner, e.g. over an relatively insecure public network such as the Internet.

So in embodiments, the computer terminal may be arranged to supply the signed unlock file to said storage location via a network, e.g. via an internet such as the Internet.

The computer terminal may be remote from said device, e.g. being separated by at least 200 meters. The computer terminal may be geographically remote from said device, e.g. being separated by at least ten kilometers.

The computer terminal may be operable to initiate the generation of the signed unlock file by means of said interaction. Said initiation may comprise supplying the copy of the identifier from the computer terminal to the portable security unit.

The computer terminal may be arranged to receive the copy of the identifier from the processor via a network, e.g. via an Internet such as the Internet Said interaction may comprise the portable security unit physically mating with the computer terminal.

In embodiments, this unlock file may be generated using a secure dongle plugged into a PC. In this case the dongle is fed the chip ID of the chip to be unlocked and it returns a signed unlock file. The private unlock key used for signing this file is kept private within the dongle.

This dongle will not compromise the security of other devices, since the private unlock key cannot be read or otherwise extracted from the dongle, with the dongle's interior device being securely packaged inside tamperproof packaging. It should also only be provided in small quantities to trusted partners with appropriate legal restrictions. Furthermore, in one particularly advantageous embodiment, the dongle is pre-programmed to allow a small number (~100) of unlock events before it has to be 'topped up', e.g. by being returned to the dongle provider or receiving a top-up file from the provider. However, apart from this the dongle should preferably allow only very limited I/O (preferably only to sign the unlock file and to receive a recharge).

So in embodiments, the portable security unit may comprise a counter arranged so as to limit the cryptography logic to generating a limited number of unlock files.

The system may comprise a recharge facility allowing an authorised provider to recharge said counter.

The recharge facility may be arranged to remotely supply a signed recharge file to the portable security unit, the recharge file being signed with a private recharge key; and the cryptography logic may be configured to use a corresponding public recharge key to verify whether the recharge file is signed with the private recharge key, and to recharge said counter on condition of thus verifying the signed recharge file.

The cryptography logic may be configured to prevent generation of multiple unlock certificates for the same identifier.

In further embodiments, the additional code may be signed with a private code key, the code authentication procedure may be configured to verify the additional code using a public code key corresponding to the private code key, and the unlocking authentication procedure may be configured to verify the unlock file using a public unlock key corresponding to the private unlock key.

The additional code may be signed with one of a higher-security instance of the private code key and a lower-security instance of the private code key; and at the higher-security level, the code authentication procedure may require the additional code to be verified using an instance of the public code key corresponding to the higher-security instance of the first private key; and at the lower security level, the code authentication procedure may allow the additional code to be verified using an instance of the public code key corresponding to the lower-security instance of the first private key.

The boot code may comprise primary and secondary boot code, the primary boot code being stored in a read-only memory embedded on said processor; and the processor may be hardwired to execute the primary boot code upon start-up or reset of the processor, the primary boot code may comprise a preliminary authentication procedure configured to verify whether the secondary boot code is authenticated for execution on the processor, and the secondary boot code may comprise said code authentication procedure and unlocking authentication procedure.

The secondary boot bode may be signed with a first-stage private code key, the additional code may be signed with a second-stage private code key, the preliminary authentication procedure may be configured to verify the secondary boot code using a first-stage public code key corresponding to the first-stage private code key, and the secondary boot code may be configured to verify the additional code using a second-stage public code key corresponding to the second-stage private code key.

The additional code may comprise a data authentication procedure configured to verify whether data is authenticated for loading on said processor.

The data may be signed with a private data key, and the data authentication procedure may be configured to verify the data using a public data key corresponding to the private data key.

The cryptography logic may comprise a cryptoprocessor and memory storing a cryptography function arranged for execution on the cryptoprocessor.

The private unlock key may be physically sealed within the portable security unit. The private unlock key may be arranged not to be externally addressable. Said portable security unit may comprise one of a USB dongle and a smart card.

According to another aspect of the present invention, there is provided a method of unlocking a device comprising a processor and a memory storing boot code arranged to be automatically executed by the processor upon start-up or reset, wherein the boot code comprises a code authentication procedure operable to verify whether additional code is authenticated for execution on the processor, the method comprising: within a separate security unit, using a private unlock key to sign a portion of data, to thereby generate a signed unlock file; and supplying the unlock file to a storage location accessible to the processor, such that the unlock file is made available to the processor without requiring connection between the processor and security unit; and wherein the boot code further comprises an unlocking authentication procedure, and the method further comprises executing the code authentication procedure upon boot to check for availability of the unlock file in the storage location, and if available to verify whether the unlock file is authenticated for use on the processor based on its signature, so as to de-restrict the boot authentication procedure on condition of verifying the unlock file.

The method may comprise further steps in accordance with any of the above system features.

BRIEF DESCRIPTION OF THE DRAWINGS

For a better understanding of the present invention and to show how it may be put into effect, reference is made by way of example to the accompanying drawings in which.

DETAILED DESCRIPTION OF PREFERRED EMBODIMENTS

In the following embodiments, the present invention modifies the secure boot code to look for and authenticate a signed unlock file which includes the ID of the current chip (processor). If present, the secure boot and potentially any other security aware applications will accept other code and data that is not signed with a secure production-strength key (but instead only requires signing with a less secure development-strength key).

Figure 3:
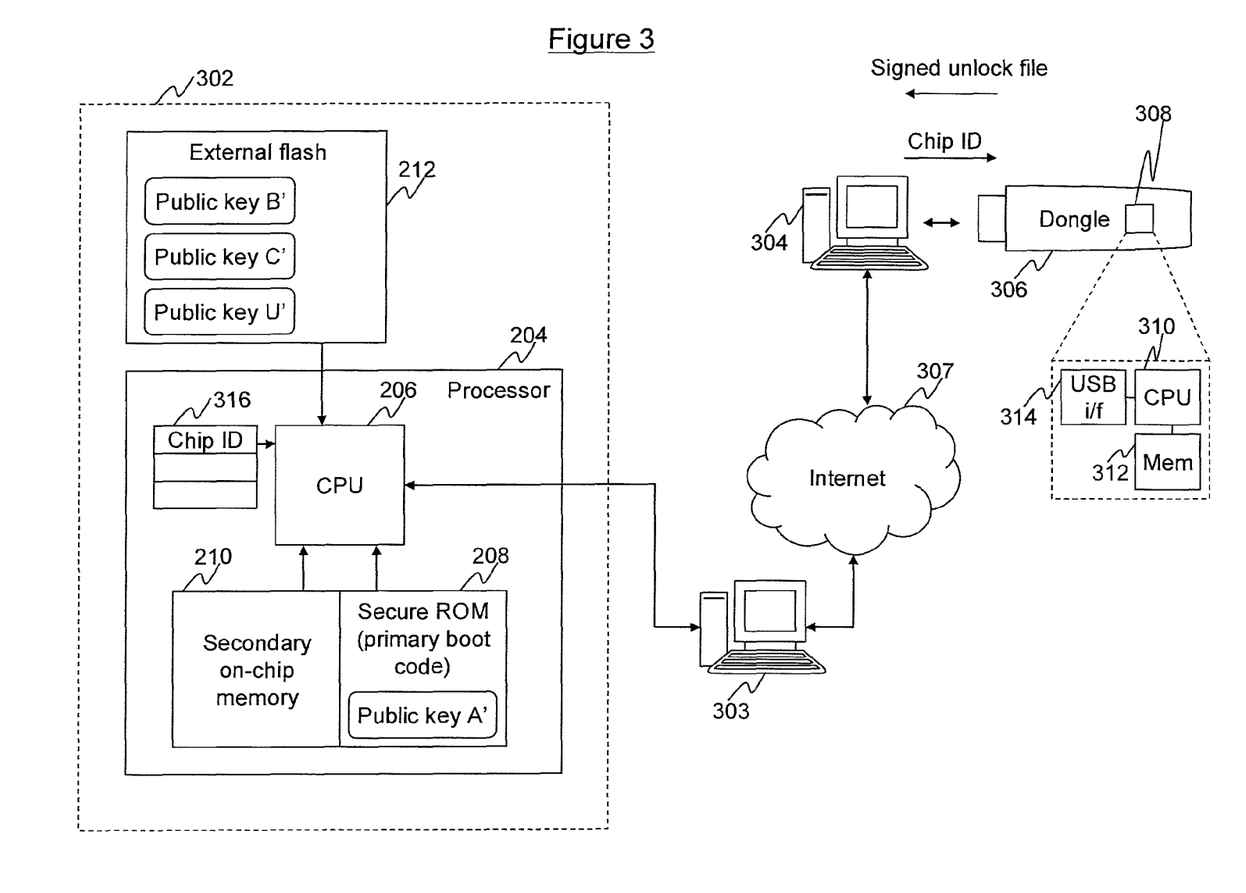
FIG. 3 is a schematic block diagram of a processor system for authenticating an unlock file to unlock the running of unsigned secondary code.

FIG. 3 shows a processor 204 similar to that described in relation to FIG. 2, comprising a CPU 206, and a primary boot memory 208 storing primary boot code. The processor 204 is coupled to an external memory 212 which stores secondary boot code, and other applications and/or data. Alternatively the secondary boot code could be stored in a secondary on-chip memory 210, and/or the other applications or data could be stored in a magnetic storage medium or retrieved from the Internet, but in the following examples it will be assumed that these are on stored the off-chip memory 212 in the form of an external flash memory.

Any soft code to be run on a locked production device 302 is signed by a private production key, thus indicating its authenticity (assuming it is indeed authentic). The boot code is arranged so as to be automatically executed by the CPU 206 upon start-up or reset of the processor 204, and when so executed to verify the authenticity of the signature using the corresponding public production key.

In fact, in preferred embodiments there are multiple stages of production keys, as discussed below.

The secondary boot code is signed with a first-stage private production key A. The CPU 206 is hard-wired so as to automatically begin executing the primary boot code from the primary boot memory 208 upon start-up or reset of the processor. The primary boot code is arranged so as when executed in this manner to verify the authenticity of secondary boot code using a corresponding first-stage public production key A'. The primary boot code will thus only allow the secondary boot to be executed on condition that it is verified to have been authentically signed with the correct first-stage private production key A.

Applications are signed with a second-stage private production key B. The secondary boot code comprises the part of the boot code responsible for loading applications, and is arranged so as when executed to verify the authenticity of any application it is attempting to load using a corresponding second-stage production key B'. The secondary boot code will thus only load applications it has verified to have been authentically signed with the correct second-stage private production key B.

Further, any data required by an application will be signed with a third-stage private production key C. Any security application run one the processor should be arranged to verify the authenticity of the data using a corresponding third-stage public production key C'. The applications will thus only operate on data that they have verified to have been authentically signed with the correct third-stage private production key C.

Data in the sense used above means information other than instructions of the program code itself.

The processor 204 is mounted within a production platform in the form of a device 302, e.g. a circuit board for use in a product such as a mobile terminal, wireless data card or other user equipment. Other components such as the external flash 212 or an RF front-end (not shown) may be mounted within the same device 302 and operatively coupled to the processor 204.

The processor 204 comprises a bank of fuses 316 such as e-fuses or laser fuses. In particularly preferred embodiments, these comprise at least one fuse which when blown sets the processor 204 into a restricted production mode, but otherwise sets it into a de-restricted development mode. For each of said stages of production key pairs described above, there is also provided a corresponding pair of development keys. The boot code and applications are configured so as to check the mode of the processor 204 and, if the development mode is enabled, then at each stage to first attempt to authenticate the next stage using the development keys. If the authentication based on the development keys is not successful, it then reverts to an authentication based on the production keys. In the production mode on the other hand, only code and data signed with the production keys can be successfully verified and run.

That is, in the development mode, the primary boot code initially tries using a first-stage public development key $A_{dev}'$ to verify whether or not the secondary boot code is authentically signed with the corresponding first-stage private development key $A_{dev}$. If not, it then tries using the first-stage public production key $A_{prod}'$ to verify whether the secondary boot code is authentically signed with the first-stage private production key $A_{prod}$. If either verification check is successful then the primary boot code allows the secondary boot code to be executed, but if neither is successful then the primary boot code prevents the secondary boot code being executed. This may result in the boot being halted and perhaps an exception being generated.

In turn, assuming the first-stage authentication procedure was successful, the secondary boot code then tries using a second-stage public development key $B_{dev}'$ to verify whether any applications it is to load have been authentically signed with the corresponding second-stage private development key $B_{dev}$. If any application has not, the secondary boot code next tries using the second-stage public production key $B_{prod}'$ to verify whether the application(s) has been authentically signed with the second-stage private development key $B_{prod}$. If either verification check is successful for an application then the secondary boot code allows that application to be executed, but if an application fails both checks then the secondary boot code prevents that application being executed.

If any executed application requires data, it may furthermore require the data file to be authenticated. Therefore in that case, the application initially tries using a third-stage public development key $C_{dev}'$ to verify whether the data file has been authentically signed with a corresponding third-stage private development key $C_{dev}$. If not, it then tries using the third-stage public production key $C_{prod}'$ to verify whether the data file has been authentically signed with the third-stage private production key $C_{prod}$. If either verification check is successful then the application allows the data file to be loaded, but if neither is successful then the application will not load the data file.

In the production mode on the other hand, the relevant fuse or fuses blown in the fuse bank 316 restrict the procedure to only trying using the public production keys $A_{prod}'$, $B_{prod}'$ and $C_{prod}'$ to verify authenticity, and thus only code or data signed with the corresponding private production keys $A_{prod}$, $B_{prod}$ and $C_{prod}$ will be successfully verified. Any code or data signed with the private development keys $A_{dev}$, $B_{dev}$ or $C_{dev}$ will be rejected in the production mode, since the check based on the public development keys $A_{dev}'$, $B_{dev}'$ or $C_{dev}'$ is disabled.

The devices 302 having processors 204 in production mode (the production platforms) are provided by a supplier such as a manufacturer of a board or chip, or someone commissioning the manufacture of the board or chip. They are provided to a customer such as a maker of the user equipment in question (i.e. an industrial customer rather than an end user). For example the customer could be an OEM (original equipment manufacturer). The production platforms are provided by the supplier with the intention of being used in actual products. Development platforms on the other hand are intended for testing.

The development keys are less secure than the production keys, typically because the private development keys are made more readily available. However, most instances of the processor 204 will be fused into the production mode at manufacture. Only a few instances left in the development mode will be distributed, so the development keys can be made more readily available without compromising the security of very many instances of the processor 204.

Nonetheless, it would be desirable to allow a customer to test new code on the production platform, but only on a few individual instances of the production platform that have been specifically "unlocked" for such testing. For example, it may be desired to test new software on production devices "in the field", at a later stage than the original development testing and/or at a different location than a customer's main development site.

The unlocking preferably comprises putting the processor back into a development mode whereby it can again verify software signed only using the less secure development keys, and does not require production keys. Alternatively however, other embodiments are envisaged such as bypassing some or all of the authentication procedure altogether.

In preferred embodiments, the unlocking is achieved using a dongle 306 to generate a signed unlock file. As illustrated in FIG. 3, the CPU 206 of the production device or platform 302 is coupled to a local computer terminal 303 such as a desktop or laptop PC separate from the CPU 206, e.g. by means of a test interface or general-purpose I/O port (not shown) in the device 302. Further, there is provided a remote computer terminal 304 which may be geographically remote from the CPU 206, device 302 and its local terminal 303, but connected via a network 307 such as the Internet. The remote computer terminal 304 comprises a port such as a USB port into which the dongle 306 can be plugged.

When it is said the computer terminal 304 is geographically remote form the CPU 206, it is envisaged that they will typically be in different towns or geographical regions, or even different countries or continents, and hence separated by distances of an order of magnitude of kilometers, tens of kilometers, hundreds of kilometers or more. This would mean being beyond the reach of a local area network (LAN). However, in other situations the remote terminal 304 may only be in a different region of the same office or complex, being remote in the sense that it is beyond the reach of a local or ad-hoc connection (e.g. the maximum cable length specified by USB 2.0 is 5 meters, Bluetooth 4.0 has a range of up to 200 m, and Wi-Fi has a variable range typically of 100-200 m).

Figure 4:
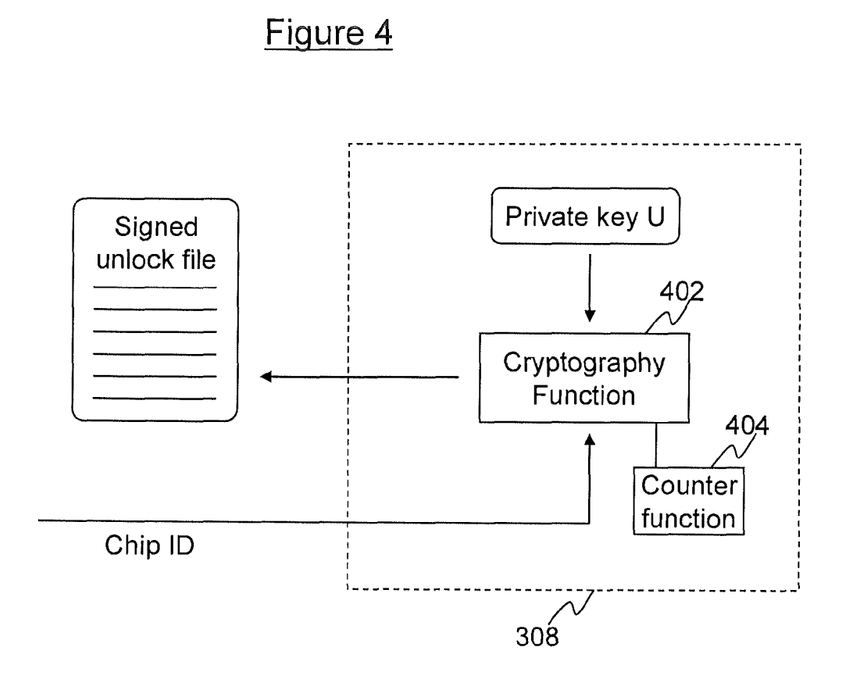
FIG. 4 is a schematic clock diagram of a process for generating a signed unlock file.

As shown in FIGS. 3 and 4, the dongle 306 itself comprises cryptography logic 308, e.g. in the form of its own processor specially included for the purpose of running a cryptography function 402. Such a processor may sometimes be referred to as a cryptoprocessor. In one particular example, the cryptoprocessor comprises a USB interface 314 for connecting to the remote computer terminal 304; a basic CPU 310; and a small, secure embedded memory 312 storing the cryptography function, arranged for execution on the CPU 310. The dongle's memory 312 also stores a private unlock key U, distinct from the development and production keys. Alternatively, the private unlock key U could be written into a separate set of fuse latches embedded into the dongle 306, and/or the cryptography logic 308 could be implemented in hard-wired circuitry.

Furthermore, the processor 204 comprises a chip identifier (ID) which uniquely identifies the chip (in fact the unique chip identifier may actually be a large random number with a very low probability of coinciding with that of another chip—this is common use if the term "unique" in the art). This chip ID is preferably written into the bank of fuse latches 316 included on the processor 204 and coupled to the CPU 206, or at least is otherwise accessible by the local computer terminal 303 (accessible, but cannot be changed). These fuse latches could be e-fuses or laser fuses for example. Alternatively, the chip ID could in principle be included in the secure primary ROM 208 (though that would typically be less practical).

If it is desired to unlock a particular production platform to test some trial code, the chip ID is supplied to the remote computer terminal 304, and a tool is then executed on the remote computer terminal 304 which supplies the chip ID to the cryptography logic 308 of the dongle 306. As shown schematically in FIG. 4, the cryptography logic 308 takes the chip ID, and potentially other information, as an input. The cryptography logic 308 uses the private unlock key U to sign this information (comprising the chip ID), and thus generates a signed unlock file which it returns to the tool running on the remote computer terminal 304. The tool in turn supplies the unlock file from the remote computer terminal 304 to the processor 204 on the production device 302. The processor 204 then stores the unlock file to the external memory 212 (or indeed to another memory such as the secondary on-chip memory 210).

Preferably the unlock file can be transferred via the network 307 and the local computer terminal 303 to the production device 302, e.g. by email; or in other embodiments it could even be transported by post or courier on a portable storage medium such as a disk or memory stick. Similarly, the chip ID may initially be provided to the remote computer terminal 304 and dongle 308 via the network 307 and local terminal 303 of the device 302, or alternatively by post or courier or even verbally.

Advantageously therefore, the system is arranged such that the production device 302 does not need to be physically connected to the dongle 306 or present on the same site as the dongle 306. Everything shown in FIG. 4 can be done remotely, at a different site than the production device 302. This is significant because the customer might be in a city such as San Jose in one country or continent, whilst the manufacturer might be in another country in Asia or Europe for example. Thus the unlock file can be supplied from the dongle 306 remotely over an insecure network or other insecure transportation means, but because the unlock file is tied to the chip ID then that unlock file cannot be used to unlock any other devices than intended and hence does not compromise the security of any other instances of the processor 204.

When the processor 204 starts up or resets, it automatically begins executing the primary boot code from the primary boot memory 208 and then the secondary boot code from the off-chip memory 212 (or secondary on-chip memory 210). The secondary boot code is configured to check for availability of a signed unlock file. For example, it may be configured to check in one or more predetermined memory locations in the secondary on-chip memory 210 and/or external memory 212. If authentic, the unlock file will have been signed with the correct private unlock key U as discussed in the preceding paragraphs. The secondary boot code comprises or has knowledge of the public unlock key U' corresponding to the private unlock key U, and is configured to use this to verify the authenticity of the unlock file if present. This authentication processes is also conditional on the chip ID of the unlock file matching the chip ID on the fuse bank 316 of the processor 204. If not, the unlock file may be authentically signed but intended for a different instance of the processor.

On condition that the unlock file is verified as authentic and indented for the present instance of the processor 204 based on its chip ID, the secondary boot code puts the processor 204 into an "unlocked" mode whereby it de-restricts the verification process by re-allowing applications and data signed with on the less secure development keys $B_{dev}$ and $C_{dev}$ to be authenticated and run, effectively putting the processor 204 back into development mode (except that the secondary boot code still had to be signed with the first-stage production key $A_{prod}$ and not the first-stage development key $A_{dev}$). Alternatively, the unlocked mode could even bypass some or all of the authentication procedure described above (or ignore the result of it), such that unsigned secondary boot code, applications, and/or data files can be run or loaded for test purposes.

If on the other hand the authentication file is not present, or not verified as authentic, or the chip ID does not match; then the processor 204 is not unlocked, no de-restriction is performed, and hence the authentication procedure based on the production keys is still required such that only applications signed with the private production key $B_{prod}$ can be run, and only data signed with the private production key $C_{prod}$ can be loaded for data processing.

Thus applications can be executed on the processor 204 and/or data can be loaded subject to either one of the following conditions being met: (i) the code and/or data is verified as being authentically signed with the higher security level private keys $B_{prod}$ and/or $C_{prod}$ respectively; or (ii) the processor has been unlocked by the presence of an authenticated unlock file signed by the private unlock key U, and the code and/or data is verified as being authentically signed with the lower security level private keys $B_{dev}$ and/or $C_{dev}$ respectively.

In one particularly preferred embodiment, the cryptography logic 308 comprises a counter 404 arranged to maintain a credit value, and to decrement each time an unlock file is generated (an "unlock event"). The counter functionality may be implemented in firmware for execution on the cryptoprocessor, or in hardwired circuitry. The counter 404 is provided to the customer charged to some initial value, e.g. of the order of magnitude a hundred, and is arranged to block any further unlock events once it has decremented to zero. The dongle's counter 404 may be arranged so that it can only be recharged (if at all) by returning it to the supplier. The credit value itself is again signed by another private key to ensure security, with the cryptograph logic 308 being arranged to verify the authenticity of the count value so that it can only be recharged by the supplier. The counter could also be recharged by receiving a signed recharge file from the supplier, with the cryptography logic 308 being arranged to verify the authenticity of the recharge file before allowing a recharge. In that case, the recharge can also be performed remotely at the customer site. Either way, the counter 404 cannot be freely recharged.

To avoid waste of unlock events, in further embodiments the cryptography logic 308 may be configured to forbid generation of multiple unlock files for the same chip ID, e.g. by storing a list of unlocked chip IDs in its associated memory 312. Alternatively, to achieve a similar end, the cryptography logic 308 could prevent the counter 404 from being decremented if the unlock event is for a chip ID that has already been unlocked (though that solution may be less secure if the original unlock file for that chip ID had been deliberately withdrawn or destroyed). As mentioned, note that the secondary boot code is configured such that the unlocking of the processor is conditional on whether the chip ID contained within the unlock file matches the chip ID of the processor 204. This prevents the same unlock file being copied and used to unlock multiple instances of the processor. Only a particular instance of the processor that has been explicitly chosen for unlocking can successfully make use of the unlock file.

Note also that the primary boot code is arranged such that it cannot be bypassed or modified by a customer or user, with the primary boot memory 208 preferably being hardwired as an initial source of boot code. Once the primary boot code has authenticated the secondary boot code, the secondary boot code is trusted just like the primary boot code and so cannot be bypassed either. Furthermore, the dongle 306 is arranged so that its internal content cannot be read or modified (except for specific secure operations such as recharging)—its internal memory is not addressable or otherwise accessible from the USB interface or such like. Each instance of the dongle 306 should preferably be kept physically locked away in a safe or such like by the manufacturer or supplier of the production platform 302 or processor 204, and by the customer who is given it, and it should only be distributed in small quantities to a limited number of trusted customers.

Hence the security of most production processors will not be compromised, because each dongle can unlock only a specific production device 302, only a few dongles will be put in circulation, and each dongle can unlock only a few end devices.

Standard PKI (Public Key Infrastructure) techniques are preferably used to distribute the public keys to customers. The advantage of the solution is that a maker of a product (the customer) can quickly unlock individual devices in the field without risking the security of other devices. This is done using trusted PKI principles. In particular, the only critical 'secrets' are the private keys used to sign the unlock files (secure in the dongle with limited number of applications or in the signing server of a secure development centre) and to recharge the dongles (held in the secure development centre and treated with the same care as the production keys). Precautions such as signing ceremonies, audit trails and witnesses should preferably be employed for all uses of the private key and the key generation.

In further embodiments, the information that is signed to form the unlock file may comprise not only the chip ID, but also an indication identifying which of a plurality of versions of the private unlock key U has been used to sign the unlock file. In case one version of the unlock key pair U becomes compromised, then a mechanism may be provided to revoke that version. In that case, a new public unlock key U' will be distributed to customers, and all further dongles 306 will be configured to sign the unlock files with a new private unlock key U. The corresponding indication in the unlock file will identify to the processor 204 which version of the public unlock key U' should be used to authenticate it.

It will be appreciated that the above embodiments have been described only by way of example.

For instance, the invention is not limited to any particular physical form of "dongle" such as a USB unit, and more generally can be implemented in any form of portable security unit. In alternative embodiments for example, the portable security unit could take the form of a smart card. In another alternative, a remote server could be configured to sign the unlock file instead of a portable security unit. The security unit may output the unlock file for supply to any storage location outside of the security unit itself which is accessible to the processor, be it on the same chip as the processor or off-chip, and be it an electronic storage medium such as flash memory or a magnetic storage medium such as a hard-drive, or otherwise.

Further, although preferred, the present invention is not limited to the multiple stages of development used to verify the authenticity of secondary boot code, applications and then data in succession. Alternatively for example, the primary boot code, secondary boot code and/or application(s) could perform their authentication based on the same key pair, or a single self-contained boot ROM could authenticate applications and/or data directly.

Further, the present invention is not limited to the particular security modes based on the development and production keys discussed above. In other embodiments there may only be one set of keys, and the de-restriction of the processor by the unlock file could comprise bypassing at least a part of the authentication procedure upon boot. Alternatively, there could be multiple levels of de-restriction, e.g. with more than just one set of development keys and one set of production keys, and with different levels of unlock file allowing access to the different levels of de-restriction. In that case, the signed information in the unlock file may comprise not only the chip ID, but also an indication identifying the level of the unlock file. Thus different kinds of security restricted and de-restricted modes are possible. Furthermore, these modes need not necessarily be set by a fuse latch, and more generally could be set by any setting, e.g. another kind of hardware setting such as a physically-sealed digital or mechanical switch, or another mechanism protected by hardware such as code or data in one-time programmable (OTP) memory. Hardware setting in this context means any setting that cannot be altered by the customer using software run either externally or on the processor 204 itself.

Further, the invention is not limited to a situation involving primary and secondary boot code. In alternative embodiments, the boot code may comprise only primary boot code comprising a loader which is operable to load other non-boot applications, subject to authentication of those applications or the presence of an authenticated unlock file. Therefore the phrase "primary" boot code as used herein does not necessarily imply the presence of secondary boot code, but more generally refers to boot code which must always be executed on start-up or reset of the processor. In such cases without a secondary boot, the primary boot code may implement the unlock file authentication.

Further, the invention is not limited to generating the unlock file remotely at a remote computer terminal 304. In other alternatives the unlock file could be generated at the local computer terminal 303 or even by plugging the dongle directly into a suitable port of the device 302. In the latter case, although the unlock file is generated by connecting the dongle 306 to the device 302, the unlock file remains available to the processor even after the dongle 306 has been subsequently disconnected.

Further, the invention is not limited to the described scenario involving a supplier and customer. In other scenarios for example, the production device could be supplied from a first department to a second department of the same organisation, and the unlock file would then allow the second department to unlock the production platform.

Further, note that the term "unlock file" does not limit to any particular file structure. In general, the unlock file can be any file, certificate or other data item in which a portion of information is signed with a private unlock key. As described, the information may comprise the chip ID and optionally an indication of which version of the private unlock key is used and/or the security level of the unlock file. The option of further elements being included in this information is not precluded. In yet further embodiments, the identifier need not be the fused chip ID, but could be another type of identifier of the chip 204 or device 302. Alternatively, the information signed in the unlock file need not necessarily include a chip or device identifier at all, allowing for the possibility of a global unlock file (though that embodiment may cause an undesirable security risk in most applications).

On another point of terminology, note that the term "authenticate" can sometimes be used in the art either to refer to the act of marking code or data as authentic by signing, or as short hand for subsequently verifying the authenticity. Ambiguity is avoided by noting the situation—the signing is performed by the party distributing the code or data, and the verification is performed by the processor after the code or data has been signed.

Further, although the above has been described in terms of a single central processing unit, this does not exclude the possibility of a multi-core processing unit of processor array. Similarly, where it is referred to a particular memory above, this does not exclude that memory may be implemented in a plurality of discrete memory units or regions. For completeness, note also that there may be DMA engine and/or a cache mechanism (not shown) arranged between the code or data's stored location and the CPU. Further, one or more of the memories may be implemented as separate program and data memories, or alternatively program code and data could be stored in one or more shared memories.

Other uses and configurations of the present invention may be apparent to a skilled person given the disclosure herein. The invention is not limited by the described embodiments, but only by the appendant claims.

The invention claimed is:

1. A system comprising:
    a device comprising a processor, an identifier of the processor, and a memory storing boot code arranged to be automatically executed by the processor upon start-up or reset, wherein the boot code comprises a code authentication procedure operable to verify whether additional code is authenticated for execution on the processor; and
    a security unit physically separate from said device and comprising a private unlock key and cryptography logic configured to use the private unlock key to sign a portion of data including a copy of the identifier of the processor, to thereby generate a signed unlock file for supply to a storage location;
    wherein the processor is arranged to access the unlock file from the storage location, such that the unlock file is made available to the processor without requiring connection between the processor and the security unit; and
    wherein the boot code further comprises an unlocking authentication procedure configured to check for availability of the unlock file in the storage location, and if available, to verify whether the unlock file is authenticated for use on the processor based on its signature and the identifier of the processor, so as to de-restrict the code authentication procedure on condition of verifying the unlock file.

2. The system of claim 1, wherein the processor has a restricted mode and a de-restricted mode and is set into the restricted mode by a hardware setting or other mechanism protected by hardware, the code authentication procedure being configured to operate at a higher security level in the restricted mode and a lower security level in the de-restricted mode; and
    wherein the unlocking authentication procedure is configured to perform said de-restriction by overriding the hardware setting or other hardware-protected mechanism and thus enabling said de-restricted mode.

3. The system of claim 2, wherein the processor is set into the restricted mode by one or more fuse latches, the unlocking authentication procedure being configured to perform said de-restriction by overriding the one or more fuse latches.

4. The system of claim 1, wherein:
    the identifier of the processor is an embedded chip identifier;
    the cryptography logic configured to use the private unlock key to sign a portion of data comprising a copy of the chip identifier, to thereby generate the signed unlock file; and
    the unlocking authentication procedure is configured to verify whether the unlock file is authenticated for use on the processor based on its signature and chip identifier.

5. The system of claim 4, wherein the chip identifier is written into fuse latches of the processor.

6. The system of claim 1, wherein the security unit is a portable security unit.

7. The system of claim 6, comprising a separate computer terminal operable to interact with the portable security unit and thereby receive the signed unlock file, and to supply the signed unlock file to said storage location.

8. The system of claim 7, wherein the computer terminal is arranged to supply the signed unlock file to said storage location via a network.

9. The system of claim 8, wherein the computer terminal is arranged to supply the signed unlock file to said storage location via an internet.

10. The system of claim 7, wherein the computer terminal is remote from said device, being separated by at least 200 meters.

11. The system of claim 10, wherein the computer terminal is geographically remote from said device, being separated by at least ten kilometers.

12. The system of claim 7, wherein the computer terminal is operable to initiate the generation of the signed unlock file by means of said interaction.

13. The system of claim 12, wherein said initiation comprises supplying the copy of the identifier from the computer terminal to the portable security unit.

14. The system of claim 13, wherein the computer terminal is arranged to receive the copy of the identifier from the processor via a network.

15. The system of claim 14, wherein the computer terminal is arranged to receive the copy of the identifier from the processor via an internet.

16. The system of claim 7, wherein said interaction comprises the portable security unit physically mating with the computer terminal.

17. The system of claim 6, wherein the portable security unit comprises a counter arranged so as to limit the cryptography logic to generating a limited number of unlock files.

18. The system of claim 17, comprising a recharge facility allowing an authorised provider to recharge said counter.

19. The system of claim 18, wherein the recharge facility is arranged to remotely supply a signed recharge file to the portable security unit, the recharge file being signed with a private recharge key; and the cryptography logic is configured to use a corresponding public recharge key to verify whether the recharge file is signed with the private recharge key, and to recharge said counter on condition of thus verifying the signed recharge file.

20. The system of claim 17, wherein the cryptography logic is configured to prevent generation of multiple unlock files for the same identifier.

21. The system of claim 1, wherein the additional code is signed with a private code key, the code authentication procedure is configured to verify the additional code using a public code key corresponding to the private code key, and the unlocking authentication procedure is configured to verify the unlock file using a public unlock key corresponding to the private unlock key.

22. The system of claim 2, wherein:
the additional code is signed with one of a higher-security instance of the private code key and a lower-security instance of the private code key;
at the higher-security level, the code authentication procedure requires the additional code to be verified using an instance of the public code key corresponding to the higher-security instance of the first private key; and
at the lower security level, the code authentication procedure can verify the additional code using an instance of the public code key corresponding to the lower-security instance of the first private key.

23. The system of claim 1, wherein:
the boot code comprises primary and secondary boot code, the primary boot code being stored in a read-only memory embedded on said processor; and the processor is hardwired to execute the primary boot code upon start-up or reset of the processor, the primary boot code comprises a preliminary authentication procedure configured to verify whether the secondary boot code is authenticated for execution on the processor, and the secondary boot code comprises said code authentication procedure and unlocking authentication procedure.

24. The system of claim 23, wherein the secondary boot code is signed with a first-stage private code key, the additional code is signed with a second-stage private code key, the preliminary authentication procedure is configured to verify the secondary boot code using a first-stage public code key corresponding to the first-stage private code key, and the secondary boot code is configured to verify the additional code using a second-stage public code key corresponding to the second-stage private code key.

25. The system of claim 1, wherein the additional code comprises a data authentication procedure configured to verify whether data is authenticated for loading on said processor.

26. The system of claim 25, wherein the data is signed with a private data key, and the data authentication procedure is configured to verify the data using a public data key corresponding to the private data key.

27. The system of claim 1, wherein the cryptography logic comprises a cryptoprocessor and memory storing a cryptography function arranged for execution on the cryptoprocessor.

28. The system of claim 6, wherein the private unlock key is physically sealed within the portable security unit.

29. The system of claim 6, wherein the private unlock key is arranged not to be externally addressable.

30. The system of claim 6, wherein said portable security unit comprises one of a USB dongle and a smart card.

31. A method of unlocking a device comprising a processor, an identifier of the processor, and a memory storing boot code arranged to be automatically executed by the processor upon start-up or reset, wherein the boot code comprises a code authentication procedure operable to verify whether additional code is authenticated for execution on the processor, the method comprising:
within a security unit physically separate from said device, using a private unlock key to sign a portion of data including a copy of the identifier of the processor, to thereby generate a signed unlock file; and
supplying the unlock file to a storage location accessible to the processor, such that the unlock file is made available to the processor without requiring connection between the processor and the security unit; and
wherein the boot code further comprises an unlocking authentication procedure, and the method further comprises executing the code authentication procedure upon boot to check for availability of the unlock file in the storage location, and if available to verify whether the unlock file is authenticated for use on the processor based on its signature and the identifier of the processor, so as to de-restrict the code authentication procedure on condition of verifying the unlock file.

32. The method of claim 31, wherein the processor has a restricted mode and a de-restricted mode and is set into the restricted mode by a hardware setting or other mechanism protected by hardware, the code authentication procedure being configured to operate at a higher security level in the restricted mode and a lower security level in the de-restricted mode; and wherein said de-restriction comprises overriding the hardware setting or other hardware-protected mechanism and thus enabling said de-restricted mode.

33. The method of claim 32, wherein the processor is set into the restricted mode by one or more fuse latches, and said de-restriction comprises overriding the one or more fuse latches.

34. The method of claim 31, wherein:
the identifier of the processor is an embedded chip identifier;
the unlock file is generated using the private unlock key to sign a portion of data comprising a copy of the chip identifier; and
the unlocking authentication procedure is configured to verify whether the unlock file is authenticated for use on the processor based on its signature and chip identifier.

35. The method of claim 34, wherein the chip identifier is written into fuse latches of the processor.

36. The method of claim 31, wherein the security unit is a portable security unit.

37. The method of claim 36, comprising receiving the signed unlock file at a separate computer terminal by interacting with the portable security unit, and supplying the signed unlock file from the computer terminal to said storage location.

38. The method of claim 37, wherein the signed unlock file is supplied from the computer terminal to said storage location via a network.

39. The method of claim 38, wherein the signed unlock file is supplied from the computer terminal to said storage location via an internet.

40. The method of claim 37, wherein the signed unlock file is supplied remotely from the computer terminal to said storage location, being separated by at least 200 meters.

41. The method of claim 40, wherein the computer terminal is geographically remote from said storage location, being separated by at least ten kilometers.

42. The method of claim 37, comprising initiating the generation of the signed unlock file by means of said interaction.

43. The method of claim 42, wherein said initiation comprises supplying the copy of the identifier from the computer terminal to the portable security unit.

44. The method of claim 43, wherein the copy of the identifier is received by the computer terminal from the processor via a network.

45. The method of claim 44, wherein the copy of the identifier is received by the computer terminal from the processor via an internet.

46. The method of claim 37 wherein said interaction comprises the portable security unit physically mating with the computer terminal.

47. The method of claim 36, comprising operating a counter within the portable security unit so as to limit the number of unlock files generated by the portable security unit.

48. The method of claim 47, comprising recharging said counter under control of an authorised provider.

49. The method of claim 48, comprising remotely supplying a signed recharge file to the portable security unit, the recharge file being signed with a private recharge key; and using a corresponding public recharge key within the portable security unit to verify whether the recharge file is signed with the private recharge key, and to recharge said counter on condition of thus verifying the signed recharge file.

50. The method of claim 31, comprising blocking generation of multiple unlock files for the same identifier.

* * * * *